(No Model.)
A. J. SIMPSON.
AUTOMATIC HEAT REGULATOR FOR VULCANIZING BATHS.
No. 392,696. Patented Nov. 13, 1888.
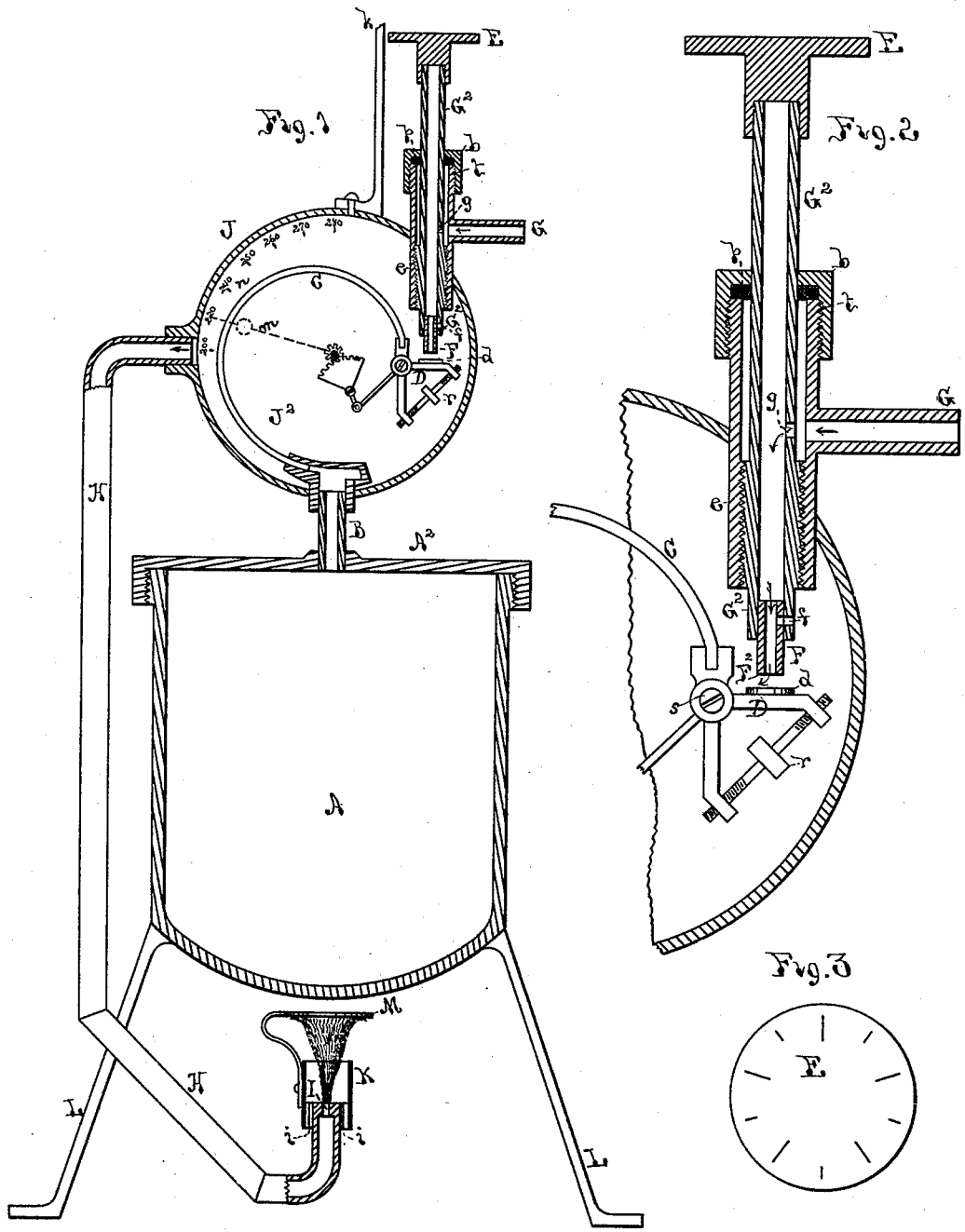
Witnesses
Clarence W. Whidden.
S. H. Cherington.
Inventor.
Andrew Jackson Simpson,
per L. J. Cherington,
his attorney in fact.

UNITED STATES PATENT OFFICE.

ANDREW JACKSON SIMPSON, OF LOWELL, MASSACHUSETTS.

AUTOMATIC HEAT-REGULATOR FOR VULCANIZING-BATHS.

SPECIFICATION forming part of Letters Patent No. 392,696, dated November 13, 1888.

Application filed February 24, 1888. Serial No. 265,185. (No model.)

*To all whom it may concern:*

Be it known that I, ANDREW JACKSON SIMPSON, a citizen of the United States, residing at Lowell, in the county of Middlesex and State of Massachusetts, have invented a certain new and useful Improvement in Automatic Heat-Regulators for Vulcanizing-Baths and other Heating-Vessels, of which the following is a specification.

My invention consists in combining with a vulcanizing or other heating vessel a chamber through which a supply of gas for heating said vessel passes, and in constructing within said chamber an automatic gas-cut-off mechanism, operated by a Bourdon spring-tube (similar to that now commonly used in steam-gages) having communication with the interior of said vessel, said tube, by the enlargement of its longitudinal curve under pressure in said vessel, serving as a means of closing an orifice for the inletting of a supply of gas, and by its returning to its normal curve under a reduction of said pressure serving to let on a supply of gas by opening said orifice.

A portion of the elements which combine to make operative my present invention is substantially described in my Letters Patent of the United States No. 332,295, dated December 15, 1885; and the present invention and claims relate particularly to the use of said Bourdon spring-tube as a means for automatically cutting off and resupplying gas to the main gas-burning orifice in lieu of using a compound laminated bar, as shown and described in said Letters Patent. I find the use of a curved spring-tube desirable in controlling the supply of gas when the temperature to be maintained is much above 212° Fahrenheit.

The construction and operation of my invention are illustrated in the accompanying drawings, of which—

Figure 1 is a vertical sectional view of a heating or vulcanizing vessel and my automatic gas cut-off connected therewith. Fig. 2 is an enlarged view of a portion of [Fig. 1, to more clearly show the details of its construction. Fig. 3 is a top view of the thumb-screw E, showing the radial index thereon.

Similar letters refer to similar parts in all the figures, as follows, viz:

A is the heating or vulcanizing vessel, presumed to be air-tight, being closed by the screw-cover $A^2$.

B is a short pipe, which effects a communication between the interior of the heating-vessel A and that of the Bourdon spring-tube C. This pipe B may be made longer and bent to form a siphon between the said vessel and tube, to the advantage of preventing heat from passing into the tube C.

J is the circular wall and $J^2$ the back wall of the close chamber through which the gas passes, and which contains the spring-tube C and the parts operating in connection therewith for automatically shutting off the gas. This chamber is presumed to be gas-tight, there being a side opposite to $J^2$, which may be made of glass to permit an interior view.

$e$ is a pipe passing through the wall J of the chamber and forming an outer case for the hollow stem $G^2$, which is screwed into case $e$ by a screw at its lower end.

G is a gas-inlet pipe communicating with the hollow in stem $G^2$ through the orifice $g$, bored in the latter.

F $F^2$ is a hollow plug screwed into the end of the stem $G^2$.

$t$, $b$, and $p$ are respectively the top of stem $G^2$, screw-cap to same, and soft packing between them, thus forming a gland which tightly packs around the stem $G^2$ while it turns within the case $e$.

E is a thumb-screw head, which is secured to the stem $G^2$ and by which it may be turned.

D is a plate fastened to the closed end of the spring-tube C, and $d$ is a piece of suitable soft material affixed thereto, which affords a readily conforming seat for closing the end $F^2$ of the hollow screw-plug F when in contact therewith.

$r$ is a set-screw by which the plate D is adjusted at right angle with the center line of the hollow in plug F, so as to form a proper bearing against the end $F^2$ of said plug, the plate D being hinged to end of tube C by the set-screw $s$.

$f$ is a small hole bored radially and coincidently through the hollow stem $G^2$ and the screw-plug F for permitting a very small supply of gas to pass into the chamber J $J^2$, and thence into the pipe H, leading to the burning-outlet I. The gas so passing through the hole $f$ serves to retain a very small jet of burning gas, which acts as a retaining-flame at the outlet I when the gas-supply at the end $F^2$ of the screw-plug F is shut off by contact of the seat $d$ with the end of said screw-plug.

The amount of gas which may pass through the hole $f$ is governed and reduced by slightly turning the screw-plug F in the hollow stem $G^2$, which throws the said hole (common to both plug F and stem $G^2$) out of coincidence, thus reducing the area of said hole through said plug and stem.

M is a plate forming a spreader, against which the flame strikes and is thereby diffused over the bottom of the vessel A, and, with the tube K, protects the small retaining-flame or jet from extinguishment.

$i$ $i$ are passages for the upward induction of air around the burning-orifice I provided around the tube H, the air so inducted mixing with the gas and making better combustion and giving greater heat.

The top of the thumb-screw E may be marked radially with an index, as shown in the top view thereof, detached, Fig. 3, indicating the degrees of heat desired to be maintained by the automatic cut-off, a pointer, $k$, being fixed at the side of said thumb-screw head.

The general operation of my invention, except that of the Bourdon spring-tube, is described in my before-named Letters Patent, No. 332,295, and the action and office of said tube in my present invention may be further and fully described, as follows: The gas-supply being connected with the tube G and the outlet in the end $F^2$ of screw-plug F being unclosed, the passage of the gas will be through the hole $g$ in the hollow stem $G^2$; thence through the longitudinal hole in said stem; thence through a similar hole in screw-plug F, out of its end $F^2$, and into the chamber J $J^2$; thence across said chamber, entering the pipe H, as shown by arrows, and thence through said pipe to the burning-orifice I, where it is ignited. The liquid or other substance in the vessel A being heated to the desired temperature, a pressure commensurate with or relative to said heat is produced within said vessel by reason of its being closed tight. This pressure being communicated through the pipe B to and within the spring-tube C, the latter enlarges its longitudinal curve and the shut-off plate D is moved toward the end $F^2$ of the screw-plug F, and when a desired heat is attained in the vessel A, as indicated by the hand $m$, pointing to a segmental index, $n$, in the chamber J $J^2$, the hollow stem $G^2$ is screwed toward the shut-off plate D until the end $F^2$ of the screw-plug F contacts with the soft-metal or leather seat $d$, and the gas is shut off from passing the end of said plug. The supply of gas is now shut off, excepting what little passes through the hole $f$ in the screw-plug F for retaining the flame. This movement of the stem $G^2$ sets it and the shut-off plate D in proper relationship to always shut off the gas-supply at that given degree of heat, and a variation of the fixed heat either way may be obtained by turning the stem $G^2$ nearer to or farther from the shut-off plate D. When the temperature in the heating-vessel A falls below the degree of heat desired to be maintained, the pressure within the said vessel is reduced proportionately, and, the pressure within the spring-tube C being likewise reduced, the longitudinal curve of the tube C is shortened and it approaches its normal shape, thus moving the shut-off plate D away from the end $F^2$ of the hollow plug F and letting on a resupply of gas. On an increase of heat again, the plate D again moves toward the plug F to close its end, and the supply of gas is again checked.

The advantages of my improvement in the use of the curved spring-tube in the manner and for the purpose described are obvious, in that it will preserve its accuracy as a means of controlling the gas-supply by pressure under a greater degree of heat than could be satisfactorily wrought by the differential expansion of different metals, which latter would in time become defective and inaccurate by being subjected to severe differential strain under the action of great degrees of heat.

I claim—

The automatic heat-regulating vulcanizing-bath and heating apparatus, consisting of the vessel A $A^2$, spring-tube C, connected therewith, chamber J $J^2$, adjustable plate D, seat $d$, screw-plug F, common orifice $g$, stem $G^2$, case $e$, cap $b$, tube G, and outlet-pipe H, the latter leading to a burning-orifice, all operating as described, and for the purpose or purposes specified.

ANDREW JACKSON SIMPSON.

Witnesses:
J. F. McALEER,
L. J. CHERRINGTON.